USO11377892B2

(12) United States Patent
Hampel et al.

(10) Patent No.: US 11,377,892 B2
(45) Date of Patent: Jul. 5, 2022

(54) DRIVER FOR A VEHICLE WINDOW REGULATOR AND VEHICLE WINDOW REGULATOR (71) Applicant: Brose Fahrzeugteile SE & Co. Kommanditgesellschaft, Bamberg, Bamberg (DE)

(72) Inventors: Klaus Hampel, Coburg (DE); Christian Salm, Bamberg (DE); Udo Taubmann, Bad Rodach-Sülzfeld (DE); Frank Wagner, Nuremberg (DE)

(73) Assignee: BROSE FAHRZEUGTEILE SE & CO. KOMMANDITGESELLSCHAFT, BAMBERG, Bamberg (DE)

( * ) Notice: Subject to any disclaimer, the term of this patent is extended or adjusted under 35 U.S.C. 154(b) by 50 days.

(21) Appl. No.: 16/963,659

(22) PCT Filed: Jul. 31, 2018

(86) PCT No.: PCT/EP2018/070719
§ 371 (c)(1),
(2) Date: Jul. 21, 2020

(87) PCT Pub. No.: WO2019/141387
PCT Pub. Date: Jul. 25, 2019

(65) Prior Publication Data
US 2021/0071455 A1 Mar. 11, 2021

(30) Foreign Application Priority Data
Jan. 22, 2018 (DE) .................... 10 2018 200 925.2

(51) Int. Cl.
E05F 11/48 (2006.01)
E05F 11/38 (2006.01)
(Continued)

(52) U.S. Cl.
CPC ............... E05F 11/385 (2013.01); B60J 1/17 (2013.01); E05D 15/165 (2013.01);
(Continued)

(58) Field of Classification Search
CPC ....... E05F 11/385; E05F 11/383; E05F 11/38; E05F 11/54; E05F 2011/387;
(Continued)

(56) References Cited

U.S. PATENT DOCUMENTS 4,770,587 A * 9/1988 Liljedahl ............... F16B 21/086
411/357
5,987,820 A * 11/1999 Shibanushi ........... E05F 11/445
49/375

(Continued)

FOREIGN PATENT DOCUMENTS

DE 19943717 A1 3/2001
DE 102004034144 A1 2/2005
(Continued)

Primary Examiner — Jerry E Redman
(74) Attorney, Agent, or Firm — Brooks Kushman P.C.

(57) ABSTRACT

A driver for a vehicle window regulator, having a pane holder for fastening to a window pane, and a rail slider with a guide region and a sliding insert lying therein. The pane holder has an approximately cylindrical connecting section which is inserted along an axial direction into a holder section of the rail slider and is surrounded by said holder section at least in sections along a circumferential direction, and the connecting section has a receptacle and the holder section has a passage opening, which receptacle and passage opening are arranged aligned with each other along a radial direction, and a joining pin is inserted into the passage opening and the receptacle.

20 Claims, 7 Drawing Sheets (51) Int. Cl.
*E05F 15/689* (2015.01)
*B60J 1/17* (2006.01)
*E05D 15/16* (2006.01)

(52) U.S. Cl.
CPC .......... *E05F 11/483* (2013.01); *E05F 15/689* (2015.01); *E05F 2011/387* (2013.01); *E05Y 2201/434* (2013.01); *E05Y 2201/612* (2013.01); *E05Y 2201/64* (2013.01); *E05Y 2201/654* (2013.01); *E05Y 2201/684* (2013.01); *E05Y 2600/46* (2013.01); *E05Y 2600/502* (2013.01); *E05Y 2900/55* (2013.01)

(58) Field of Classification Search
CPC ........ E05D 15/165; E05D 15/689; B60J 1/17; E05Y 2201/612; E05Y 2201/64; E05Y 2201/684; E05Y 2600/46; E05Y 2600/502
USPC ............................................. 49/352; 411/356
See application file for complete search history.

(56) References Cited

U.S. PATENT DOCUMENTS

| | | | |
|---|---|---|---|
| 6,125,588 A | 10/2000 | Schultz | |
| 6,854,213 B2 * | 2/2005 | Galliani | B60J 1/17 49/375 |
| 8,381,446 B2 * | 2/2013 | Trevarrow | E05F 11/385 49/375 |
| 11,162,291 B2 * | 11/2021 | Reames | E05F 11/385 |
| 2004/0088924 A1 * | 5/2004 | Moser | E05F 11/385 49/375 |
| 2005/0160675 A1 * | 7/2005 | Fenelon | E05F 11/423 49/375 |
| 2007/0022665 A1 * | 2/2007 | Bigourden | E05F 11/385 49/375 |
| 2010/0043297 A1 * | 2/2010 | Barr | E05F 11/385 49/375 |
| 2014/0086668 A1 * | 3/2014 | Lee | E06B 3/5481 403/187 |
| 2017/0241181 A1 * | 8/2017 | Reinke | E05F 11/385 |
| 2018/0326820 A1 * | 11/2018 | Huang | E05F 11/488 |
| 2020/0173212 A1 * | 6/2020 | Pavlovic | E05F 11/382 |
| 2020/0338965 A1 * | 10/2020 | Barr | B60J 1/006 |
| 2020/0386026 A1 * | 12/2020 | Reames | E05F 11/488 |

FOREIGN PATENT DOCUMENTS

| | | |
|---|---|---|
| DE | 102009033466 A1 | 1/2011 |
| DE | 102010043047 A1 | 5/2012 |
| DE | 102012102795 A1 * | 10/2013 |
| DE | 202012104557 U1 * | 2/2014 |
| EP | 0694669 A1 | 1/1996 |
| EP | 1382787 A1 * | 1/2004 |
| EP | 3461981 A1 * | 4/2019 |
| EP | 3514308 A1 * | 7/2019 |

* cited by examiner

DRIVER FOR A VEHICLE WINDOW REGULATOR AND VEHICLE WINDOW REGULATOR

CROSS-REFERENCE TO RELATED APPLICATIONS

This application is the U.S. National Phase of PCT Application No. PCT/EP2018/070719 filed on Jul. 31, 2018, which claims priority to German Patent Application No. DE 10 2018 200 925.2, filed on Jan. 22, 2018, the disclosures of which are hereby incorporated in their entirety by reference herein.

TECHNICAL FIELD

The present disclosure relates to a driver for a vehicle window lifting mechanism.

BACKGROUND

Movable vehicle window glass nowadays is usually repositioned between a closed position and an opened position by way of electrically or electromotively operated actuating devices as (vehicle) window lifting mechanisms. Such a window lifting mechanism typically include an (electric) actuator as well as an actuating mechanism which connects the actuator to the window glass, the connection being a coupling in terms of force transmission, and the actuator and the actuating mechanism are coupled to a motor vehicle door or to a motor vehicle body. The actuating mechanism herein is mechanically linked to the window glass to be moved by means of at least one driver.

Such drivers are typically disposed in the region of a lower edge of the window glass or in the region of a lateral edge of the window glass. For example, such a driver is connected and adjustable by way of a flexible traction means of the actuating mechanism, for example in the form of a cable pull mechanism (traction cable), so as to move the window glass along the adjustment path between the closed position and the opened position. A driver of this type by means of a rail slider is furthermore guided so as to be displaceable on a guide rail of the actuating mechanism, for example.

SUMMARY

The present disclosure may address one or more objects, such as specifying a suitable driver for a vehicle window lifting mechanism. A particularly simple and stable fastening of a glass holder and of a rail slider may be specified.

The advantages and preferred design embodiments set forth in terms of the driver can also be applied in analogous manner to the vehicle window lifting mechanism and vice versa.

The driver according to one or more embodiments, may be suitable for a vehicle window lifting mechanism of a motor vehicle. The driver herein may include a glass holder for fastening, for example in a clamping manner, to a window glass, and a rail slider for coupling to an (adjusting) actuating mechanism of the vehicle window lifting mechanism. The rail slider has a guiding region as an encompassing rail grip for a guide rail of the actuating mechanism. A sliding insert for improved guiding on the guide rail is placed or inserted in the guide region herein.

The glass holder may include a main body or as a driver body that may have an approximately cylindrical connecting portion which is in particular molded thereon in an integral, thus monolithic, manner. The connecting portion along a longitudinal direction of the connecting portion that is referred to as the axial direction is inserted in a holder portion of the rail slider and by the latter is bordered at least in portions along a circumferential direction (tangential direction, azimuthal direction). More than half the external circumference of the connection portion herein is in particular encompassed by the holder portion. In particular, a knuckle joint is thus formed in the cross section, and the connecting portion is configured substantially as a swivel head and the holder portion is configured substantially as a joint socket, and a rigid, thus an immovable or non-articulated, connection is configured between the rail slider and the glass holder. In other words, the rail slider and the glass holder are joined to one another in a preferably form-fitting manner along the circumferential direction and along a radial direction, and the connecting portion extending along the axial direction may be plugged into the holder portion.

The holder portion may define a through opening, the through opening along the radial direction being disposed so as to be aligned with a receptacle of the connecting portion. This means that the through opening of the holder portion opens into the receptacle of the connecting portion. The through opening of the holder portion is configured as a bore, for example, and the receptacle of the connecting portion is embodied in the manner of a blind bore or of a recess in the body of the connecting portion, for example.

A joining pin which is cylindrical or in the shape of a bolt or a barrel is inserted or press-fitted according to the invention into the mutually aligned through opening and receptacle. In other words, the joining pin at least in portions engages in the receptacle via the through opening; the through opening is thus penetrated by the joining pin. The inserted joining pin along the external circumference thereof is thus at least in portions bordered by the receptacle.

The joining pin may be simultaneously seated in the through opening of the holder portion and in the receptacle of the connecting portion such that any mutual movement of the holder portion and of the connecting portion along the axial direction is barred or blocked. An additional form-fit along the axial direction between the connecting portion and the holder portion is thus implemented by means of the radial joining pin.

In addition, during the assembling of the driver, during which the glass holder is fastened to the rail slider, centering of the connecting portion and of the holder portion is furthermore caused by the joining pin, on account of which the accuracy in terms of positioning and aligning when assembling the driver is substantially improved.

A suitable driver is implemented on account thereof. As an example, assembling of the driver which is minimized in terms of complexity and components is thus implemented, on account of which the driver can be produced in a particularly simple and cost-effective manner. A form-fit which is highly reliable in operation preferably along each direction is thus guaranteed between the connecting portion of the glass holder and the holder portion of the rail slider.

A "form-fit" or a "form-fitting connection" between at least two parts connected to one another herein and hereunder is in particular understood to be that the cohesion of the parts connected to one another at least in one direction takes place by direct mutual engagement of contours of the parts per se or by indirect mutual engagement by way of an additional connecting part. The "blocking" of any mutual movement in this direction thus takes place in a form-related manner.

The form-fit along the radial and circumferential direction herein takes place on account of the direct axial mutual engagement of the connecting portion of the glass holder in the holder portion of the rail slider. The joining pin is oriented so as to be perpendicular to the joining direction (axial direction) of the connecting portion and of the holder portion. The form-fit in terms of the axial direction is thus implemented indirectly by the joining pin engaging in the through opening and the receptacle. A mechanically strong and reliable fastening of the rail slider and of the glass holder is effected on account thereof, on account of which a particularly stable driver is formed.

Fastening may be compact in terms of installation space is furthermore implemented on account of the perpendicular alignment of the joining pin in terms of the joining direction of the connecting portion and of the holder portion. The required installation space of the driver is reduced on account thereof, and may be advantageous with a view to an installation situation according to the intended use in a motor vehicle door or a motor vehicle body.

The glass holder in one suitable embodiment is configured as a clamping part which in the cross section is approximately U-shaped and which in the installed state fastens the window glass in a clamping manner, thus in a non-destructive manner, between the two vertical U-legs. The connecting portion of the glass holder herein is in particular configured as the horizontal U-leg, and the axial direction is aligned so as to be perpendicular to the cross-sectional plane.

The indications in terms of the spatial directions hereunder are in particular also stated in a coordinate system of the motor vehicle (vehicle coordinate system) in terms of an exemplary installed situation in a side door of the motor vehicle. The abscissa axis (X-axis) herein is oriented along the vehicle longitudinal direction (direction of travel) and the ordinate axis (Y-axis) is oriented along the vehicle transverse direction, and the applicate axis (Z-axis) is oriented along the vehicle height. The axial direction is thus oriented so as to be substantially parallel to the abscissa axis (X), and the radial direction of the joining pin is preferably aligned so as to be substantially parallel to the ordinate axis (Y).

In one or more embodiments, the rail slider is embodied from a mechanically stable plastics material such that the actuating forces of the actuating mechanism acting when in operation can be transmitted in a safe and reliable manner. The rail slider herein is embodied, for example, from a polyamide (PA), in particular from a glass-fiber reinforced polyamide (GFRPA), for example with a glass fiber proportion of approximately 35%.

In order for the window glass to be reliably clamped, the glass holder is suitably produced from an at least partially flexurally flexible or flexurally elastic plastics material, for example from a polypropylene (PP), in particular from a glass-fiber reinforced polypropylene (GFRPP), for example with a glass fiber proportion of approximately 30%.

The sliding insert may be formed by a plastic material part having positive sliding properties, thus having a relatively low frictional resistance in relation to guiding on the guide rail. On account thereof, substantially resistance-free guiding of the driver along the guide rail of the actuating mechanism is guaranteed. The sliding insert herein is produced from a polyoxymethylene (POM), for example. Alternatively, the running faces of the sliding insert that bear on, or are capable of bearing on, the guide rail are at least provided or coated with such a plastics material.

The glass holder and the rail slider as well as the sliding insert herein are in each case preferably embodied as injection-molded parts. A particularly cost-effective production of reduced complexity of the driver is guaranteed on account thereof.

In one or more embodiments, the joining pin is produced from a rubber-elastic material, thus from a soft, elastically deforming material. In addition to the form-fit and to the centering of the connecting portion and of the holder portion when inserting or press-fitting the joining pin, at least a certain degree of mutual compensation of tolerances between the connecting portion and the holder portion is also enabled on account of the deformation capability thus implemented.

The diameter of the joining pin herein can have at least a certain oversize in terms of the available width or of the diameter of the through opening and/or of the receptacle such that the joining pin in terms of the radial direction thereof is at least partially deformed when inserted or press-fitted into the through opening and/or the receptacle. The conjunction "and/or" here and hereunder is to be understood such that the features linked by means of the conjunction may be configured conjointly as well as mutual alternatives.

The joining pin is clamped in the through opening and/or in the receptacle by virtue of the (radial) restoring forces caused by the deformation. In other words, the joining pin is seated in a force fitting manner in the connecting portion and/or the holder portion. It is avoided in an advantageous and simple manner in terms of construction that the joining pin undesirably slides out of the through opening and/or the receptacle, thus that the (axial) form-fit is undesirably loosened or released. Particularly stable and operationally reliable fastening of the connecting portion and of the holder portion is thus implemented. On account thereof, the joining pin joins the glass holder and the rail slider in a form-fitting as well as a force-fitting manner.

A "force-fit" or a "force-fitting connection" between at least two parts connected to one another here and hereunder is in particular understood such that the parts connected to one another are prevented from sliding away from one another by virtue of a frictional force acting between the parts. The force-fitting connection can no longer be maintained and is thus released in the absence of a "connecting force" which causes the frictional force (that is to say that force that pushes the parts against one another, for example a force of screws or the inherent weight force per se).

In one embodiment that may be relatively compact in terms of installation space, the joining pin may be oriented so as to be perpendicular to a longitudinal direction of the sliding insert. The longitudinal direction of the sliding insert is oriented substantially along a longitudinal direction of the rail of the guide rail and, for example, runs so as to be oblique or inclined to the abscissa axis (X) and oblique or inclined to the applicate axis (Z). The sliding insert is thus disposed so as to be somewhat skewed to the axial direction of the connecting portion and of the holder portion.

In one or more embodiments, the joining pin is at least partially covered by the sliding insert. On account thereof, undesirable sliding of the joining pin from the through opening and/or the receptacle in the operation of the driver or the window lifting mechanism is advantageously counteracted in a simple manner in terms of construction by the sliding insert. The axial form-fit is further improved in terms of operational safety and reliability on account thereof.

As an example, the joining pin has an oversize along the radial direction of the connecting portion and of the holder portion, and herein protrudes from the through opening of the rail slider. In other words, the joining pin along the longitudinal direction thereof is dimensioned such that the joining pin in the inserted state at least partially projects beyond the through opening of the rail slider. This means that the joining pin at least in portions projects beyond the rail slider in the guiding region. On account thereof, ready access to the joining pin is enabled in the case of servicing or repairing the driver, on account of which simple disassembling of the driver is guaranteed.

As another example, the joining pin at the free end bears on the sliding insert. The joining pin herein exerts a preload force on the sliding insert. The preload force herein is in particular directed in such a manner that the sliding insert is reliably fastened in the guiding region of the rail slider. A force-fit at least to a certain degree between the guiding region and the sliding insert is thus also caused by the joining pin. Operationally safe and reliable fastening of the sliding insert is guaranteed on account thereof, on account of which reliable guiding of the rail slider on a guide rail is ensured.

In one or more embodiments, the guiding region of the rail slider has two molded guide claws which are disposed so as to be mutually spaced apart, and the sliding insert for improving the sliding properties is releasably fastened by a snap-fit between the guide claws. A particularly material-saving embodiment of the guiding region of the rail slider is implemented on account thereof.

In one embodiment, the through opening and the receptacle as well as the joining pin seated therein are disposed on the connecting portion or on the holder portion, respectively, so as to be approximately centric along the axial direction. In particular, the through opening and the receptacle as well as the joining pin are disposed so as to be approximately centric along the axial direction between the guide claws of the guiding region such that the preload force caused by the joining pin acts so as to be approximately centric or central on the slider insert. Particularly stable and reliable mounting of the sliding insert on the guiding region is guaranteed on account thereof.

In another embodiment which is secured against rotation the joining pin completely penetrates the receptacle of the connecting portion. The joining pin at the end side herein engages in a mating receptacle of the holder portion that is disposed so as to be diametrically opposite the through opening. A form-fit which is particularly secure in the axial direction is implemented on account thereof.

As an example, the driver described above is part of a vehicle window lifting mechanism of a motor vehicle. A window glass of the motor vehicle is moved between a closed position and an opened position by means of the vehicle window lifting mechanism. The vehicle window lifting mechanism herein suitably has an electric actuator which by way of an actuating mechanism and at least one driver moves the window glass.

The at least one driver in the installed state in terms of function is mechanically linked to the window glass in a fixed manner, for example in the region of a lower edge or a lateral edge. The driver by means of the rail slider is guided so as to be displaceable in a linear manner on a guide rail. On account thereof, the window glass in a movement of the rail slider along the guide rail is conjointly moved between the closed position and the opened position.

BRIEF DESCRIPTION OF THE DRAWINGS

An exemplary embodiment of the invention will be explained in more detail hereunder by means of a drawing in which.

Equivalent parts and variables are at all times provided with the same reference signs in all figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
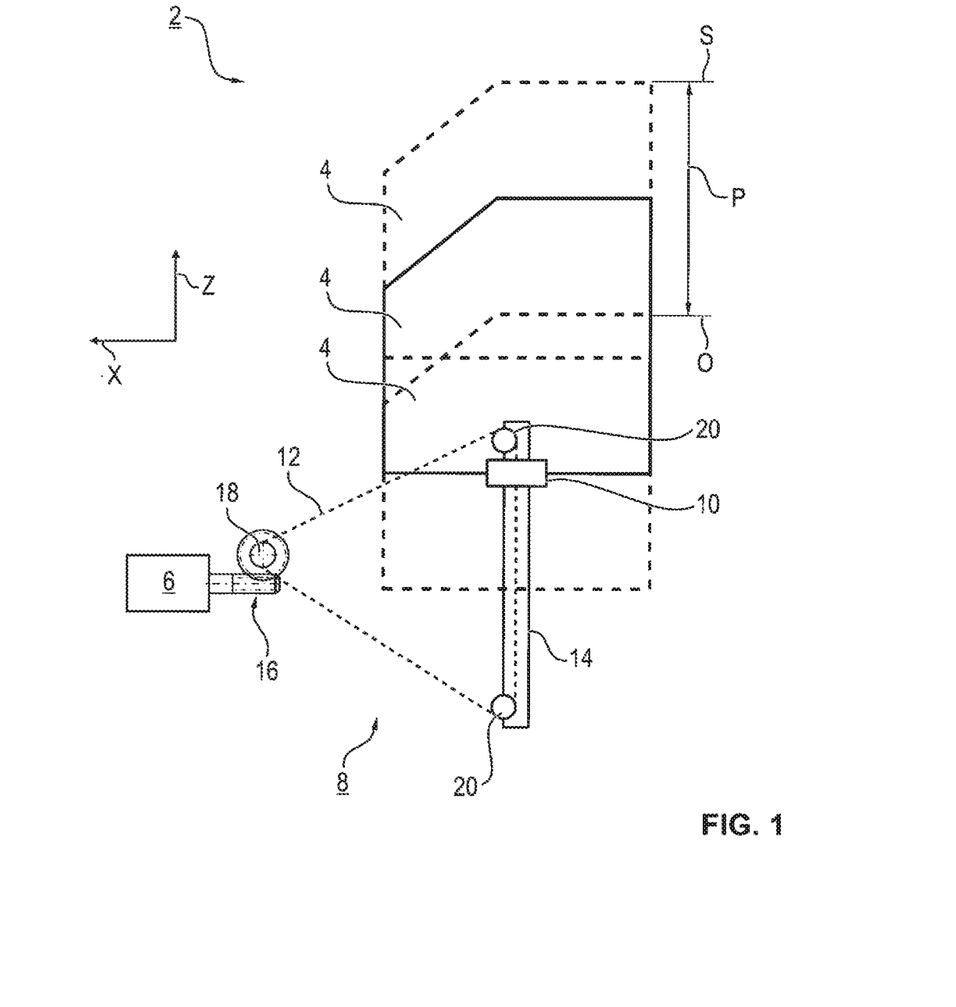
FIG. 1 in a schematic illustration shows a vehicle window lifting mechanism having an actuator and having an actuating mechanism as well as a driver which couples the actuating mechanism to a window glass.

An electric vehicle window lifting mechanism 2 as an actuating device for a (vehicle) window glass 4 of a motor vehicle is shown in a simplified and schematic illustration in FIG. 1. The (vehicle) window lifting mechanism 2 has an actuator 6 which by means of an actuating mechanism 8 and a driver 10 acts on the window glass 4. The window lifting mechanism 2 is disposed in a frameless vehicle door of the motor vehicle, for example.

The actuating mechanism 8 in the exemplary embodiment shown is embodied in the manner of a cable window lifting mechanism with two guides. The actuating mechanism 8 herein has a cable pull 12 and a guide rail 14 for the driver 10.

The actuator 6 of the window lifting mechanism 2 by way of a worm gear or spur gear mechanism 16 drives a cable drum 18 of the actuating mechanism 8. A traction cable of the cable pull 12 is disposed on the cable drum 18 in such a manner that winding and unwinding of the traction cable takes place in rotations of the cable drum 18 that are caused by the gear mechanism 16. The cable pull 12, embodied as a Bowden cable, for example, moves the window 4 by way of deflection rollers 20 of the guide rail 14.

In an activation of the actuator 6 the window glass 4 is repositioned in terms of the (glass) position P thereof. The window glass 4 herein is repositionable in a reversible manner between a closed position S, which represents the highest possible position P, and an opened position O, which represents the lowest possible position P. The window glass 4 in FIG. 1 is in each case indicated by dashed lines in the positions S and O. In contrast, the window glass 4 by way of solid lines is illustrated in a semi-opened intermediate position.

Figure 3:
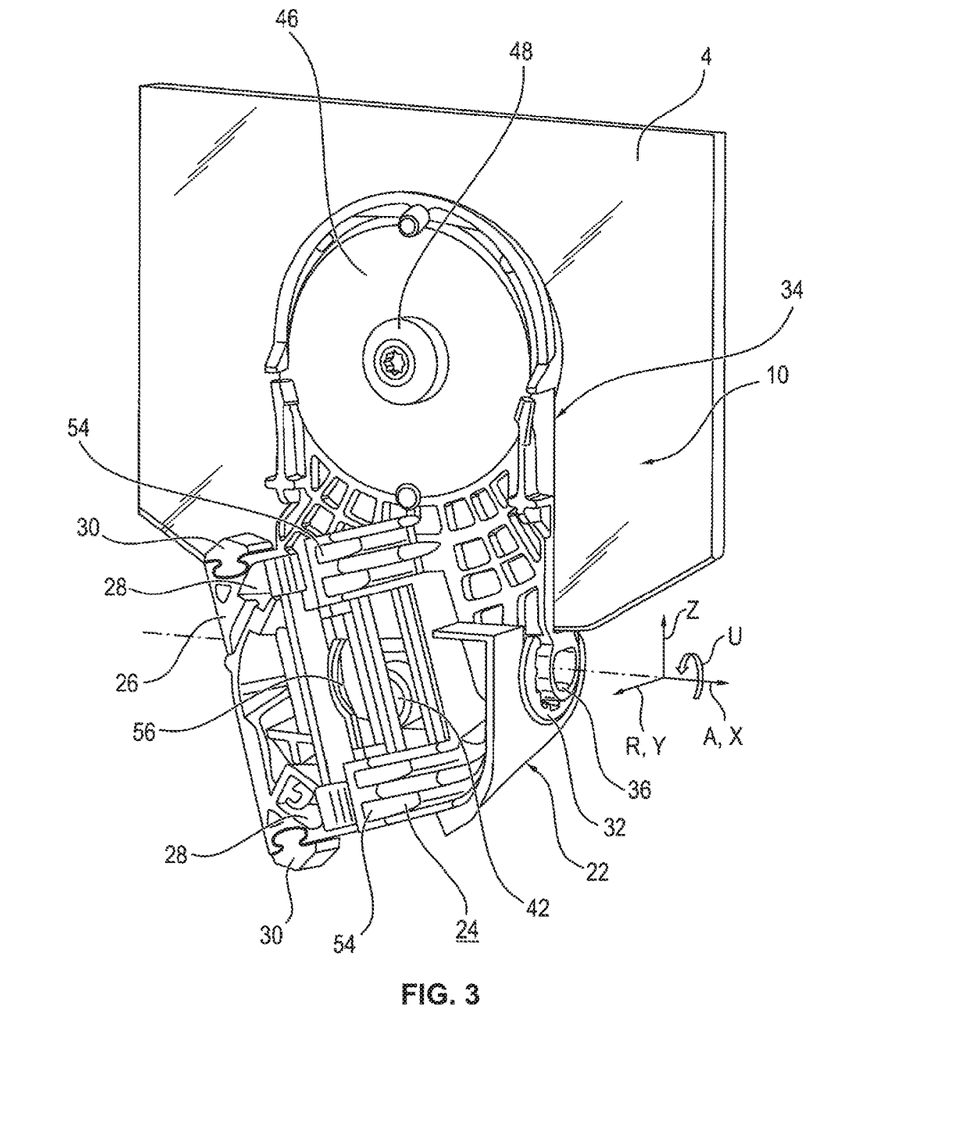
FIG. 3 is a perspective fragmented illustration shows the driver and the window glass.
Figure 4:
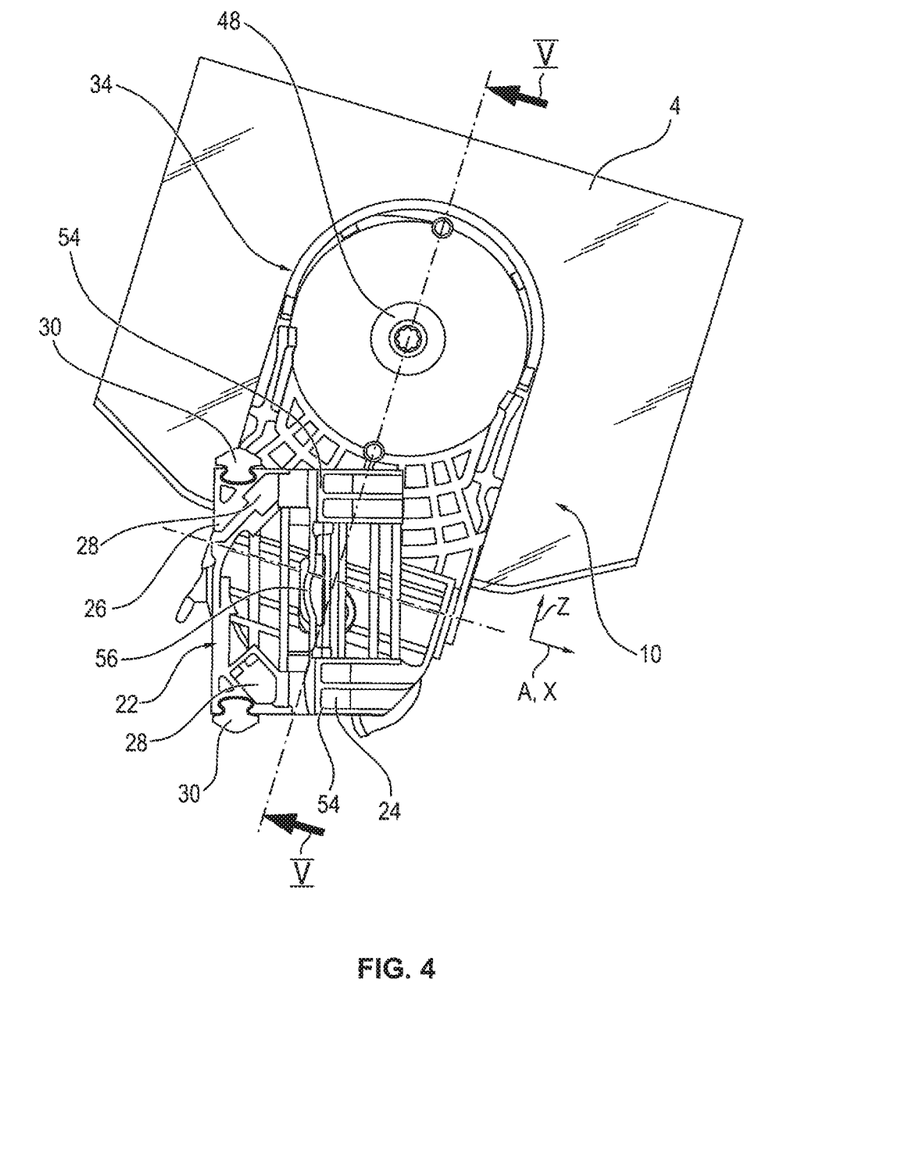
FIG. 4 is an overhead view shows the driver and the window glass.
Figure 5:
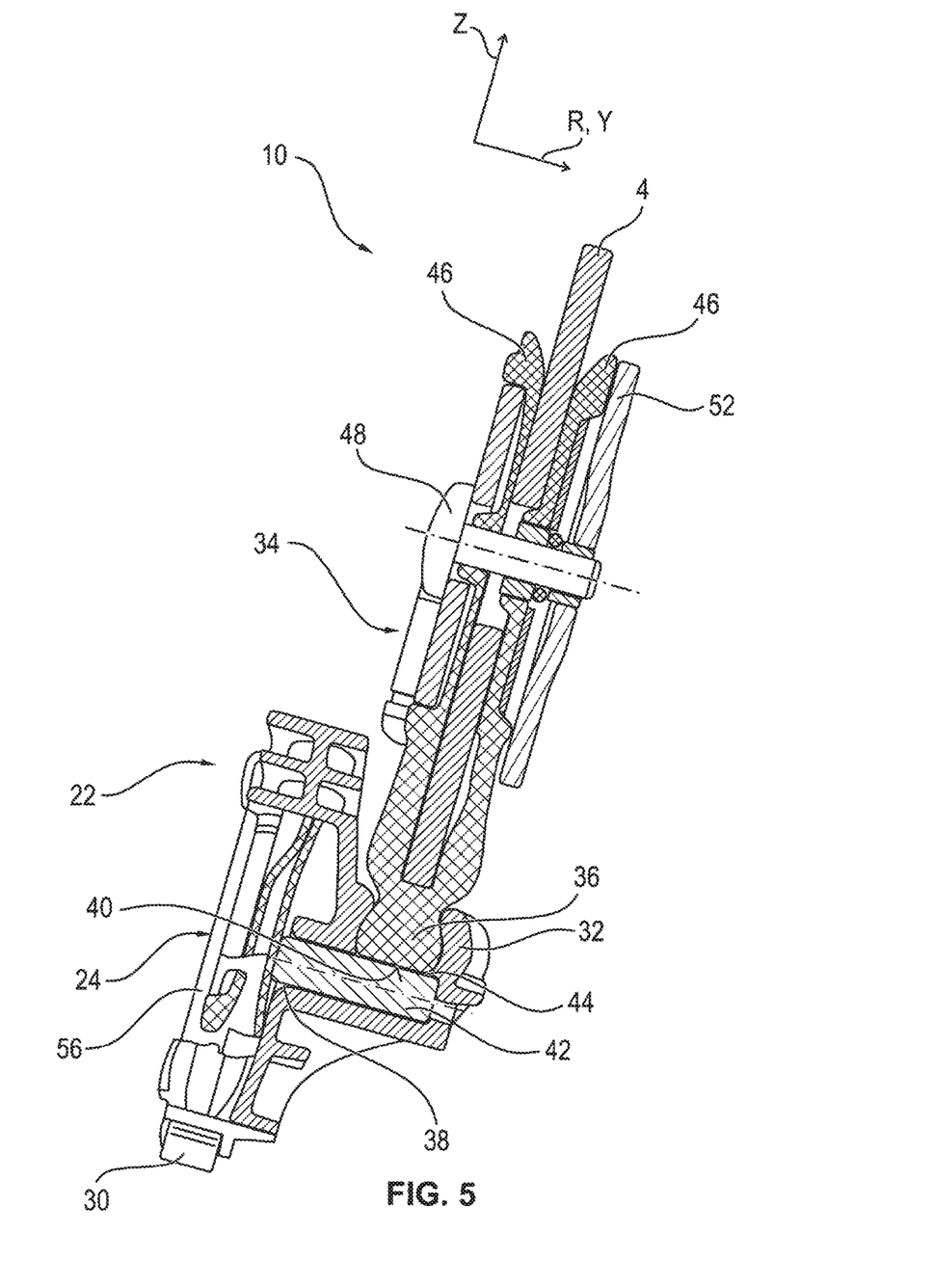
FIG. 5 is a sectional illustration with a view onto the section plane shows the driver and the window glass.
Figure 6:
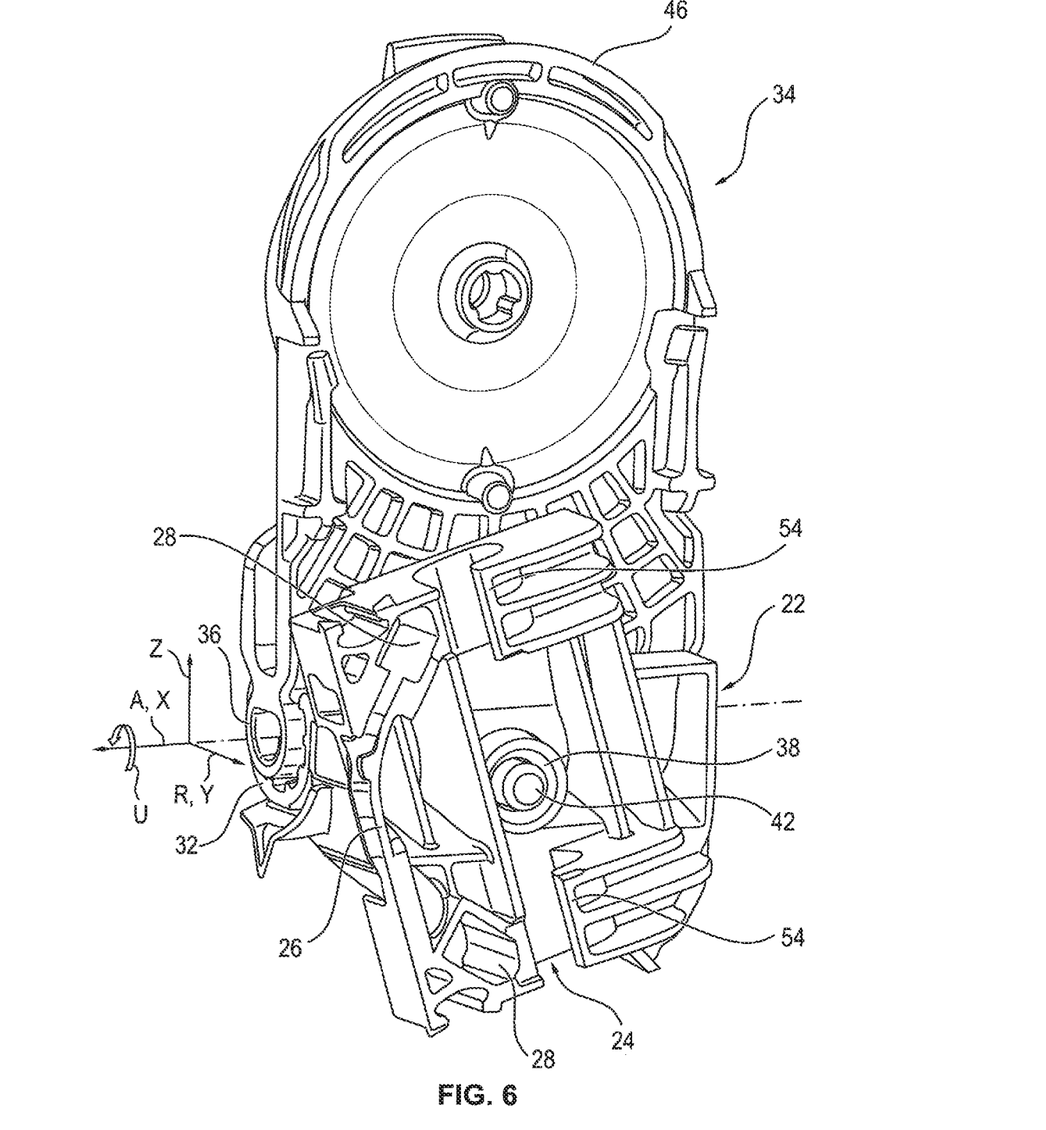
FIG. 6 is a perspective illustration with a view onto a guiding region shows the glass holder and the rail slider having a joining pin connecting the two latter.
Figure 7:
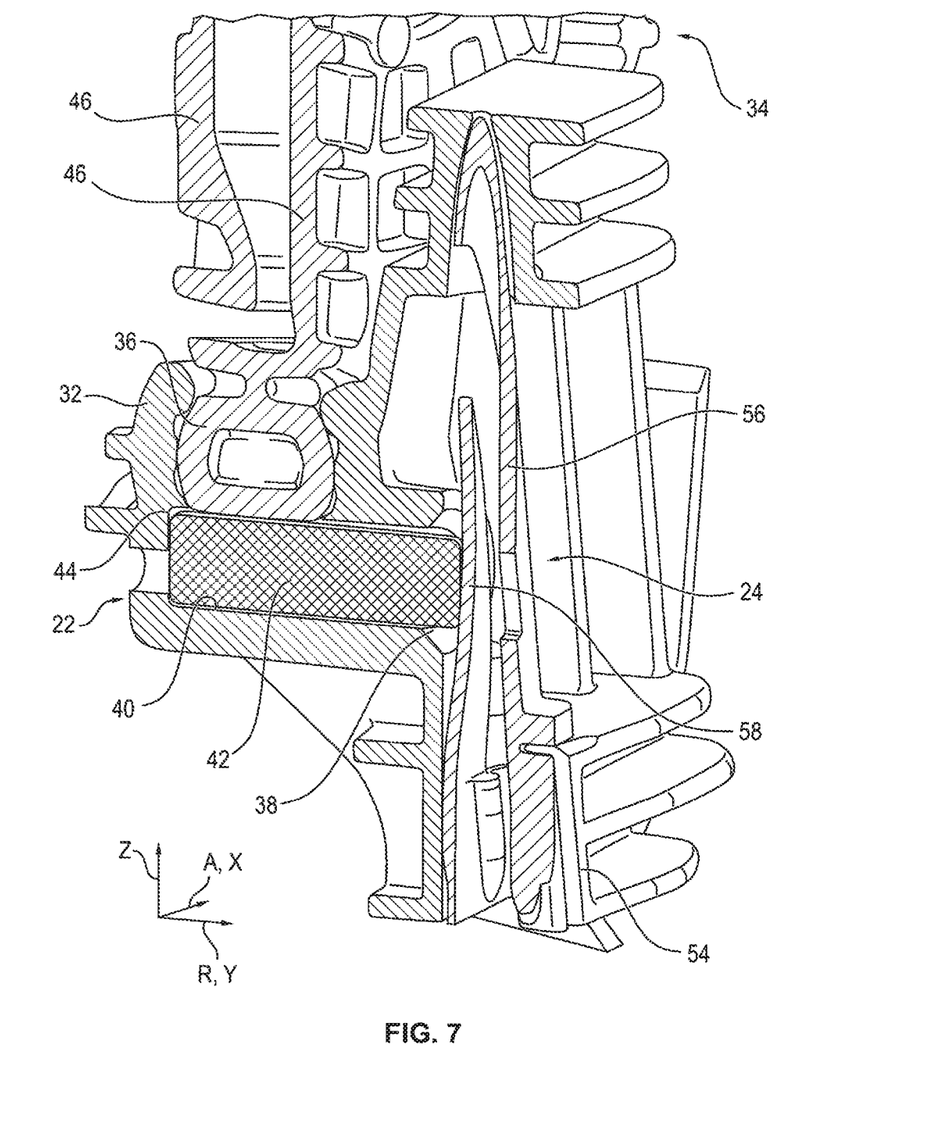
FIG. 7 is a sectional fragmented illustration shows the guiding region.

The construction of the driver 10 is explained in more detail hereunder by means of FIGS. 2 to 7. FIG. 5 and FIG. 7 herein show sectional illustrations according to the section line V-V in FIG. 4.

The driver 10 has a rail slider 22 on which a guiding region 24 (FIG. 3) is provided as an encompassing rail grip for guiding the driver 10 so as to be movable or displaceable in a linear manner on the guide rail 14 of the window lifting mechanism 2. The rail slider 22 in addition to the guiding region 24 has a fastening region 26 for coupling and fastening to the traction cable of the cable pull 12.

The fastening region 26 has two nipple chambers 28 (FIG. 3, FIG. 4, FIG. 5) to which cable nipples of the cable pull 12 are hooked or can be hooked so that an actuating force transmitted by way of the cable pull acts on the driver 10 and moves or adjusts the latter along the guide rail 14.

In order to predefine a terminal position of the driver 10 in the closed position S and in the opened position O, the rail slider 22 has two detents 30 which are fastened or can be fastened in the fastening region 26 and by means of which the driver 10 is stopped in a defined manner at a respective mating detent. The mating detents (not shown in more detail) herein are attached to the guide rail 14, for example, or on a support component of the motor vehicle door that holds the guide rail 14. The detents 30 are embodied from a damping, rubber-elastic material, for example, such that a mechanically damped and noise-minimized detent is implemented on the respective mating detent.

The rail slider 22 of the driver 10 furthermore has a holder portion 32 for mounting a glass holder 34. The driver 10 by means of the glass holder 34 is coupled, or can be coupled, to the window glass 4 in a mechanically fixed manner. The connecting portion 36 herein is in particular molded so as to be integral, thus monolithic, on the glass holder 34. The connecting portion 36 for fixing the glass holder 34 on the rail slider 22 is inserted into the holder portion 32 of the rail slider 22 along the longitudinal direction of the connecting portion 36, referred to as the axial direction A.

Figure 2:
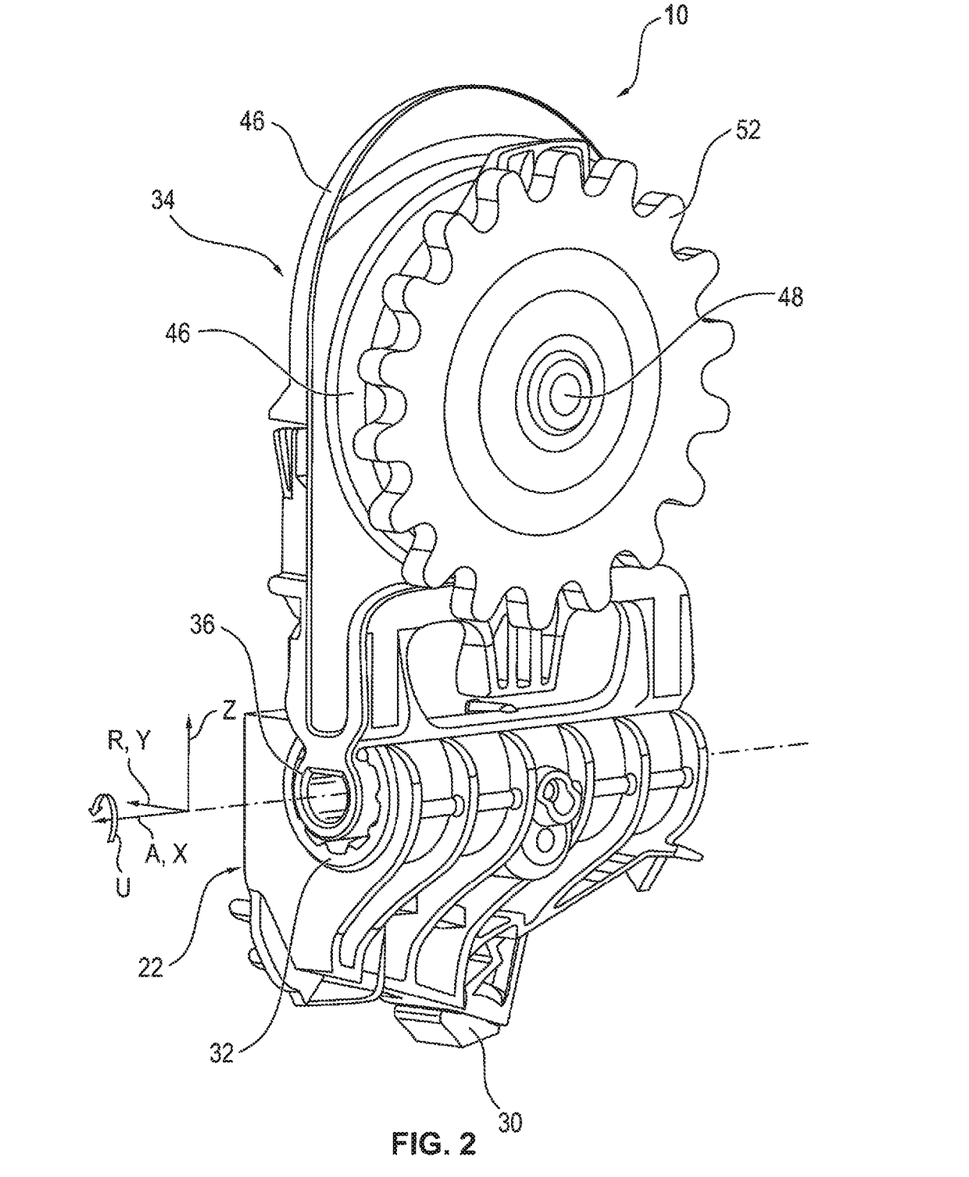
FIG. 2 is a perspective illustration shows the driver having a glass holder and having a rail slider.

As can be seen, for example, in the illustrations of FIGS. 2 and 5, the connecting portion 35 herein along a circumferential direction (tangential direction, azimuthal direction) U is bordered in portions by the holder portion 32. This means that the external circumference of the connecting portion 36 in the inserted state is at least in portions encompassed in a form-fitting manner by the holder portion 32. As can be seen in the sectional illustration of FIG. 5, for example, more than half the external circumference of the connecting portion 36 herein is encompassed by the holder portion 32.

The connecting portion 36 and the holder portion 32 in the joint state thus have a cross-sectional shape which is approximately in the manner of a hinge joint, and the connecting portion 36 is configured substantially as a swivel head and the holder portion 32 is configured substantially as a joint socket. A rigid, thus an immovable or non-articulated, connection is configured between the rail slider 22 and the glass holder 34. On account thereof, the rail slider 22 and the glass holder 34 along the circumferential direction U and along a radial direction R which is oriented so as to be perpendicular to the latter are joined to one another in a form-fitting manner, and the connecting portion 36 is plugged into the holder portion 32 along the axial direction.

The indications in terms of the spatial directions hereunder are also stated in a coordinate system of the motor vehicle (vehicle coordinate system) in terms of the exemplary installed situation in a side door of the motor vehicle. The abscissa axis (X-axis) herein is oriented along the vehicle longitudinal direction and the ordinate axis (Y-axis) is oriented along the vehicle transverse direction, and the applicate axis (Z-axis) is oriented along the vehicle height. The axial direction A herein is oriented so as to be parallel to the abscissa axis (X), and the radial direction R is aligned so as to be substantially parallel to the ordinate axis (Y).

The holder portion 32 which is integrally molded on the rail slider 22 has a through opening 38 in the manner of a bore, which along the radial direction R is disposed so as to be aligned with a receptacle 40 of the connecting portion 36. The through opening 38 of the holder portion 32 thus opens coaxially into the receptacle 40 of the connecting portion 36.

A joining pin 42 which is cylindrical or in the shape of a bolt or a barrel is inserted or press-fitted in the through opening 38 and the receptacle 40. The joining pin 42 which is oriented along the radial direction R or the Y-direction herein along the external circumference thereof is at least in portions bordered by the receptacle 40. On account thereof, the radial joining pin 42 along the axial direction A or the X-direction effects an additional form-fit between the connecting portion 36 and the holder portion 32.

The form-fit along the radial direction R and the circumferential direction U herein takes place on account of the direct axial mutual engagement of the connecting portion 36 of the glass holder 34 in the holder portion 32 of the rail slider 22. The joining pin 42 is oriented so as to be perpendicular to the joining direction (axial direction A) of the connecting portion 36 and of the holder portion 32. The form-fit in terms of the axial direction A is thus implemented indirectly on account of the engagement of the joining pin 42 in the through opening 38 and in the receptacle 40.

In the course of assembling the driver 10, during which the rail slider 22 is joined to the glass holder 34, the joining pin 42 acts as a centering aid in the in particular axial positioning of the connecting portion 36 in relation to the holder portion 32.

The joining pin 42 is produced from a rubber-elastic, thus from a soft, elastically deforming material. A certain degree of compensation of (axial) tolerances between the connecting portion 36 and the holder portion 32 is thus also enabled in the course of assembling on account of the deformation capability of the joining pin 42.

As can be seen in particular in the sectional illustrations of FIG. 5 and FIG. 7, the joining pin 42 completely penetrates the receptacle 40 of the connecting portion 36. The joining pin 42 at the end side engages in a mating receptacle 44 of the holder portion 32 which is disposed so as to be diametrically opposite the through opening 38. The through opening 38 and the mating receptacle 44 herein are conjointly embodied as, for instance, a bore in the manner of a blind bore or a depression or a recess of the holder portion 32 along the radial direction R, or the Y-direction, respectively, and the mating receptacle 44 is configured as a radial detent for the joining pin 42.

The receptacle 40 is embodied as a recess of the connecting portion 36, for example, the recess in the XZ-plane, thus the plane oriented so as to be perpendicular to the joining plane 42, having an approximately U-shaped cross-sectional shape. The external circumference of the joining pin 42 is thus only partially encompassed by the receptacle 40. At least half of the external circumference of the joining pin 42 is preferably bordered by the receptacle 40. Alternatively, it is likewise possible for the receptacle 40 to be embodied so as to be circumferentially closed, thus for the receptacle 40 to be incorporated as a substantially cylindrical recess in the connecting portion 36, for example.

The diameter of the joining pin 42 has at least a certain oversize in terms of the available width or of the diameter of the through opening 38 and/or of the receptacle 40 and/or of the mating receptacle 44. On account thereof, the joining pin 42 in terms of the radial direction thereof is at least partially deformed when inserted or press-fitted into the through opening 38 and/or into the receptacle 40 and/or into the mating receptacle 44. The restoring forces caused on account thereof clamp the joining pin 42 in a force-fitting manner in the through opening 38 and/or in the receptacle 40 and/or in the mating receptacle 44. The joining pin 42 is thus press-fitted in particular in a force-fitting manner into the connecting portion 36 and/or the holder portion 32. It is avoided on account thereof that the joining pin 42 undesirably slides out, on account of which a particularly reliable form-fit and force-fit is implemented between the holder portion 32 and the connecting portion 36.

The glass holder 34 in the YZ-plane has an approximately U-shaped cross-sectional shape. The vertical U-leg herein is formed by the axial connecting portion 36, thus the connecting portion 36 which is oriented along the X-direction, and the two vertical U-legs are configured as clamping legs 46 for an in particular form-fitting and clamping connection or linking of the driver 10 to the window glass 4.

A receptacle gap which is not referred to in more detail and in which a portion of the window glass 4 in the region of a lower edge of the glass can be introduced according to the intended use is formed between the clamping legs 46. In the installed state (cf. FIG. 3 to FIG. 5) the window glass 4 in portions is thus disposed between the two clamping legs 46.

For the purpose of reliable and operationally safe clamping or linking to the window glass 4, the glass holder 34 has a fastening element 48. The fastening element 48 is configured as a screw, for example. The fastening element 48 herein is driven in each case into one threaded bore 50 of the clamping legs 46 such that the clamping legs 46 are movable relative to one another in a movement of the fastening element 48. The fastening element 48 for easier activation is coupled in a rotationally fixed manner to a helical gear 52, for example.

The guiding region 24 of the rail slider 22 for encompassing the guide rail 14 has two molded guide claws 54 which are disposed so as to be spaced apart. A sliding insert 56 which can be snapped fitted or is snapped fitted is releasably fastened between the guide claws 54, the sliding insert 56 as a bearing face or running face bearing on the guide rail 14. The sliding insert 56 is embodied as a plastics material part having particularly positive sliding properties, thus having an ideally low frictional resistance in relation to guiding on the guide rail 14.

The longitudinal direction of the sliding insert 56 between the guide claws 54 is oriented along a longitudinal direction of the rail of the guide rail 14 and in the installed state in the exemplary embodiment illustrated runs so as to be approximately oblique or inclined to the X-axis and to the Z-axis. The sliding insert 56 is thus oriented so as to be somewhat skewed to the axial direction A of the connecting portion 36 and of the holder portion 32. This means that the joining pin 42 is oriented so as to be perpendicular to the longitudinal direction of the sliding insert 56.

The joining pin 42 in the snap-fitted state of the sliding insert 56 is at least partially covered by the latter. On account thereof, the gliding insert 56 prevents the joining pin 42 from undesirably sliding out of the through opening 38 and/or from the receptacle 40 and/or from the mating receptacle 44.

As can be seen in particular in FIGS. 6 and 7, the joining pin 42 along the radial direction R or the Y-direction has an oversize. In other words, the joining pin 42 along the longitudinal direction thereof is dimensioned in such a manner that the free end of the joining pin 42 in the inserted state at least partially protrudes from the through opening 38 of the rail slider 22. The free end of the joining pin 42 herein bears on the sliding insert 56.

The joining pin 42 herein exerts a radially directed preload force on the sliding insert 56. In other words, the free end of the joining pin 42 along the radial direction R, thus along the Y-direction, pushes against the snap-fitted sliding insert 56. The sliding insert 56 herein has a spring-elastic or flexurally elastic base region 58 which is at least partially deformed or bent by the free end (FIG. 7). The resulting restoring force acts as an in particular radially directed preload force for improved mounting of the sliding insert 56 on the guide claws 54. A force-fit at least to a certain degree between the guiding region 24 and the sliding insert 56 is thus also caused by the joining pin 42.

The through opening 38 and the receptacle 40 as well as the mating receptacle 44 and the joining pin 42 are disposed so as to be approximately centric along the axial direction A between the guide claws 54 of the guiding region 24. On account thereof, the preload force of the joining pin 42 acts so as to be approximately centric or central on the sliding insert 56.

In one suitable design embodiment of the driver 10, the glass holder 34 and the rail slider 22 as well as the sliding insert 56 are in each case embodied as injection-molded parts.

The rail slider 22 herein is embodied from a mechanically stable plastics material such that the actuating forces of the actuating mechanism 8 acting when in operation are guided in a safe and reliable manner. For example, the rail slider 22 is embodied from a polyamide (PA), in particular from a glass-fiber reinforced polyamide (GFRPA), for example with a glass fiber proportion of approximately 35%.

In order for the window glass to be reliably clamped, the glass holder 34 is suitably produced from an at least partially flexurally flexible or flexurally elastic plastics material, for example from a polypropylene (PP), in particular from a glass-fiber reinforced polypropylene (GFRPP), for example with a glass fiber proportion of approximately 30%.

The sliding insert 56 is produced from a polyoxymethylene (POM), for example.

The invention is not limited to the exemplary embodiment described above. Rather, other variants of the invention can be derived therefrom by the person skilled in the art without departing from the subject matter of the invention. Furthermore, all individual features described in the context of the exemplary embodiment can in particular also be mutually combined in another manner without departing from the subject matter of the invention.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SIGNS

2 Vehicle window lifting mechanism
4 Window glass
6 Actuator

8 Actuating mechanism
10 Driver
12 Cable pull mechanism
14 Guide rail
16 Worm gear/spur gear mechanism
18 Cable drum
20 Deflection roller
22 Rail slider
24 Guiding region
26 Fastening region
28 Nipple chamber
30 Detent
32 Holder portion
34 Glass holder
36 Connecting portion
38 Through opening
40 Receptacle
42 Joining pin
44 Mating receptacle
46 Clamping leg
48 Fastening element
50 Threaded bore
52 Helical gear
54 Guide claw
56 Sliding insert
58 Base region
P Glass position
S Closed position
O Opened position
A Axial direction
U Circumferential direction
R Radial direction
X, Y, Z Spatial direction While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A driver for use in a vehicle window lifting mechanism, the driver comprising:
   a glass holder configured to be fastened to a window glass and including a connecting portion having an approximately cylindrical shape extending in an axial direction and defining a receptacle;
   a rail slider including a holder portion defining a through opening, a guiding region, and a sliding insert lying in the guiding region, wherein the connecting portion is inserted into the holder portion so that the holder portion at least partially circumferentially surrounds the connecting portion; and
   a joining pin inserted into the receptacle and the holder portion, wherein the receptacle and the holder portion each extend in a radial direction so that receptacle is aligned with the holder portion.

2. The driver of claim 1, wherein the joining pin formed of a rubber-elastic material.

3. The driver of claim 1, wherein the joining pin is oriented perpendicular to a longitudinal direction of the sliding insert.

4. The driver of claim 1, wherein the joining pin is at least partially covered by the sliding insert.

5. The driver of claim 1, wherein the joining pin protrudes from the through opening.

6. The driver of claim 1, wherein a free end of the joining pin is configured to exert a preload force to the sliding insert.

7. The driver of claim 1, wherein the guiding region of the rail slider includes two molded guide claws spaced apart from one another and wherein the sliding insert is releasably secured by a snap-fit connection between the two molded guide claws.

8. The driver of claim 1, wherein the through opening, the receptacle, and the joining pin are each disposed on the connecting portion and the holder portion so that the through opening, the receptacle, and the joining pin are each are approximately centric along an axial axis defining the axial direction.

9. The driver of claim 1, wherein the joining pin completely penetrates the receptacle and engages a mating receptacle defined by the holder portion, and wherein the mating receptacle is disposed diametrically opposite to the through opening.

10. A vehicle window lifting mechanism configured to adjust a window glass of a motor vehicle, vehicle window lifting mechanism comprising:
    an actuator;
    an actuating mechanism including,
      a guide rail,
      a cable drum, and
      a cable, wherein the cable drum is operatively connected to the actuator; and
    a driver connected to the cable and including,
      a glass holder configured to be fastened to a window glass and including a connecting portion having an approximately cylindrical shape extending in an axial direction and defining a receptacle,
      a rail slider including a holder portion defining a through opening, a guiding region, and a sliding insert lying in the guiding region, wherein the connecting portion is inserted into the holder portion so that the holder portion at least partially circumferentially surrounds the connecting portion, and
      a joining pin inserted into the receptacle and the holder portion, wherein the receptacle and the holder portion each extend in a radial direction so that receptacle is aligned with the holder portion.

11. The vehicle window lifting mechanism of claim 10, wherein the sliding insert is configured to move along the guide rail as the window glass is adjusted.

12. The vehicle window lifting mechanism of claim 10, wherein the driver includes a first clamping leg disposed on a first side of the driver and a second clamping leg disposed on a second side of the driver, and the second side opposes the first side, wherein the sliding insert is disposed on the second side and the joining pin extends from the first side to the second side and engages the sliding insert.

13. The vehicle window lifting mechanism of claim 12, wherein the sliding insert includes a base region configured to deflect as a force is applied to the base region by the joining pin.

14. The vehicle window lifting mechanism of claim 12, further comprising:
    a helical gear lying along the first clamping leg; and
    a fastener extending through the helical gear and engaging at least one of the first clamping leg and the second clamping leg.

15. The vehicle window lifting mechanism of claim 12, wherein the rail slider includes first guide claw and a second guide claw spaced apart from the first guide claw, wherein the sliding insert is disposed between the first guide claw and the second guide claw.

16. The vehicle window lifting mechanism of claim 15, wherein the first guide claw is positioned closer to the first clamping leg than the second guide claw.

17. The vehicle window lifting mechanism of claim 16, wherein the first guide claw and the second guide claw engage the sliding insert to form a snap-fit connection.

18. A driver for use in a vehicle window regulator and configured to carry a windowpane, the driver comprising:
- a glass holder including a pair of legs connected at a connecting portion and configured to receive the windowpane, the connecting portion having an approximately cylindrical shape extending in an axial direction and defining a receptacle;
- a rail slider including a holder portion, a guiding region, and a sliding insert lying in the guiding region, wherein the connecting portion is inserted into the holder portion so that the holder portion so that the holder portion at least partially circumferentially surrounds the connecting portion;

and
- a pin extending into the receptacle and the holder portion, wherein a free end of the pin is configured to apply a preload force to the sliding insert.

19. The driver of claim 18, wherein the sliding insert is configured to move along a guide rail of the vehicle window regulator as the windowpane is adjusted.

20. The driver of claim 18, wherein the pin is configured to prevent the holder portion from moving with respect to the connecting portion in the axial direction.

* * * * *